Nov. 7, 1967  J. H. DUNN ET AL  3,351,944
COMPLETE SIMPLIFIED HOMING SYSTEM FOR AIRCRAFT
Filed Jan. 17, 1966  4 Sheets-Sheet 1

INVENTOR
DEAN D. HOWARD
JOHN H. DUNN

BY  J. M. Webster  AGENT
R. S. Sciascia  ATTORNEY

United States Patent Office 3,351,944
Patented Nov. 7, 1967

3,351,944
COMPLETE SIMPLIFIED HOMING
SYSTEM FOR AIRCRAFT
John H. Dunn, 5508 Ridgefield Road, Springfield, Md.
21784, and Dean D. Howard, 8914 Oak Lane, Oxon
Hill, Md. 20028
Filed Jan. 17, 1966, Ser. No. 521,221
13 Claims. (Cl. 343—113)

ABSTRACT OF THE DISCLOSURE

A receiver system for homing on a signal source of polarized electromagnetic energy. The horn antenna of the system is shaped so that different modes are propagated therein when the directional axis of the antenna is not aligned with the signal source. Diode detectors are located in uniquely dimensioned waveguides connected to the antenna to sense the different modes and produce signals which are combined to provide indications of azimuth and elevation errors and of received signal strength.

---

This invention relates to a receiver and, more particularly, to a receiver for use in a microwave homing system.

The receiver of the instant invention is suitable for use in a homing system including either a single transmitter radiating an amplitude modulated polarized, microwave signal or a number of transmitters each radiating an amplitude modulated, polarized, microwave signal and each being uniquely identifiable by their respective frequencies of modulation.

Those concerned with the development of homing system receivers have long recognized the need for a relatively inexpensive receiver with the capacity to provide a highly accurate indication of the angular error between the axis of directivity of the receiver and any given transmitter.

The general purpose of this invention is to fulfill this need. To do so, the present invention contemplates: using a symmetrical, single aperture, electromagnetic horn; deriving from the horn the modulation component of the symmetrical mode energy excited therein upon illumination thereof by the transmitted signal; deriving from the horn the modulation component of the unsymmetrical mode energy excited therein upon unsymmetrical illumination thereof by the transmitted signal; feeding the modulation components of the symmetrical and unsymmetrical mode energy to a phase discriminator whereby a voltage having an appropriate sign and being proportional to the angular error is obtained; and applying this voltage to an angular error indicating device. Furthermore, where the present invention is to be used in a homing system including a number of transmitters which are each uniquely identified by their respective modulation frequencies, the present invention contemplates passing the modulation components of the symmetrical and unsymmetrical mode energy through respective band-pass filters centered about the modulation frequency of the desired transmitter prior to the phase discriminator whereby the phase discriminator responds execlusively to the desired transmitter.

An object of the present invention is the provision of an accurate and inexpensive microwave homing system receiver.

Another object is to provide an inexpensive microwave homing system receiver capable of providing accurate elevation angular error information and approximate distance information.

A further object of the invention is the provision of an inexpensive microwave homing system receiver capable of providing accurate azimuth angular error information and approximate distance information.

Still another object is to provide an inexpensive microwave homing system receiver capable of providing accurate azimuth and elevation angular error information and approximate distance information.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1:
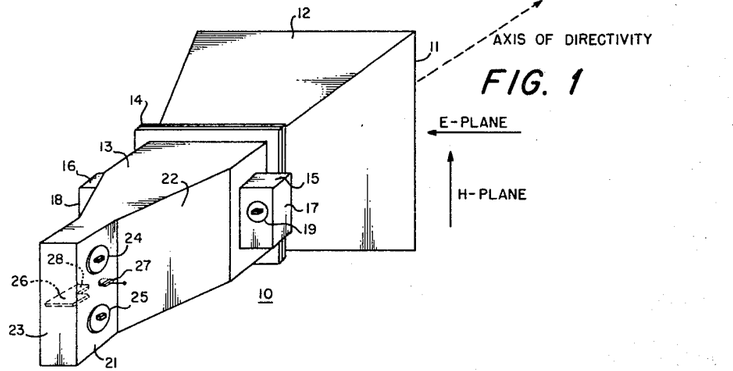
FIG. 1 is a perspective view of a horn suitable for use where azimuth and elevation angle information are desired.

Turning now to FIG. 1 wherein a horn 10 suitable for use to derive both azimuth and elevation angle error information is shown, horn 10 has single aperture 11 and is symmetrical about its axis of directivity. For purposes of illustration, E-plane and H-plane vectors are shown to correlate the horn with horizontally polarized or right or left circularly polarized radiated energy. The dimensions of aperture 11 and the flare rate thereto are selected in accordance with principles well known in the art to optimize beam width.

Flared portion 12 provides a transition between the required dimensions of aperture 11 and waveguide 13. A flange 14 may be used between tapered portion 12 and waveguide 13 to simplify the assembly. Preferably, waveguide 13 is a square waveguide having a height and width both capable of supporting the $TE_{2,0}$ mode whereby the $TE_{1,1}$ and $TM_{1,1}$ modes excited therein have equal propagation velocities throughout its length; however, it should be understood that waveguide 13 need, in practice, have a width only large enough to support the $TE_{1,1}$ and $TM_{1,1}$ modes. The length of waveguide 13 is chosen to be as small as possible for purposes of compactness and minimization of frequency dependence and yet, consistent with the establishment of field uniformity therein.

Two smaller waveguides 15 and 16 respectively connected on opposite sides of waveguide 13 in the E-plane. Waveguides 15 and 16 each have a width capable of supportion the $TE_{1,0}$ mode and are respectively terminated by short circuiting plates 17 and 18. Oppositely poled crystal detectors are respectively disposed in each of waveguides 15 and 16 at a point where the signal coupled therein is at a maximum. In the view shown, only detector 19, which is disposed in waveguide 15, is shown, but it should be understood that an oppositely poled detector 20 (FIG. 2a) is similarly located in waveguide 16.

Waveguide 13 is coupled to waveguide 21 by waveguide 22 which is tapered in the E-plane. Waveguide 21 has a height equal to the double dominant mode width in the H-plane so that the $TE_{1,0}$ and $TE_{2,0}$ mode energy excited in waveguide 13 in the H-plane propagate thereto. However, the width of waveguide 21 is so narrow that not even cross polarized $TE_{1,0}$ mode energy excited in waveguide 13 propagates thereto. The taper rate of waveguide 22 is selected according to principles well known in the art to maximize the coupling of the $TE_{1,1}$ and $TM_{1,1}$ modes excited in waveguide 13 into waveguides 15 and 16.

Waveguide 21, which is terminated by a short circuiting plate 23, has oppositely poled crystal detectors 24 and 25 disposed therein at points of maximum signal energy.

Due to the symmetry of horn 10 and the definition of the modes, the energy of the $TE_{1,1}$ and $TM_{1,1}$ modes excited in the E-plane of waveguide 13 will divide equally between and be of the same phase at detectors 19 and 20. For the same reasons, the energy of the $TE_{2,0}$ mode excited in the H-plane of waveguide 13 will divide equally between and be of opposite phases at detectors 24 and 25.

The depths to which metal septum 26 and dielectric slab 27 are inserted into waveguide 21 and the width of quarter wave step 28 on septum 26 are adjusted so that the $TE_{1,0}$ mode energy excited in waveguide 13 divides equally between detector pairs 19, 20 and 24, 25, so that the $TE_{1,0}$ mode energy couples to detectors 19 and 20 with opposite phases and is in phase with the $TE_{1,1}$ and $TM_{1,1}$ modes at one of detectors 19 and 20 and out of phase with such modes at the other of detectors 19 and 20, and so that the $TE_{1,0}$ mode energy couples to detectors 24 and 25 with the same phase and is in phase with the $TE_{2,0}$ mode at one of detectors 24 and 25 and out of phase therewith at the other of detectors 24 and 25.

A typical method used to adjust the insertion depths of septum 26 and slab 27 and the width of quarter wave step 28 to obtain the above specified relationships can be found in the copending application of Dean D. Howard, entitled Simplified Single-Horn Monopulse Tracker, Ser. No. 197,831, filed May 23, 1961, now U.S. Patent No. 3,267,475.

It should be understood that the disposition of detectors 19 and 20 in waveguides 15 and 16 respectively and of detectors 24 and 25 in waveguide 21 is preferred for purposes of compactness. However, in practice, it may be desired to place probes in some or all of waveguides 15, 16, and 18 and locate the detectors at a place remote therefrom.

The operation of horn 10 and the derivation of angular error information therefrom can be best understood from the following analysis of the effect of the illumination of aperture 11 by an amplitude modulated, horizontally, polarized signal.

If there is no angular error between the axis of directivity of horn 10 and the transmitter radiating the signal, the phase front of the signal illuminating aperture 11 is symmetrical about the axis of directivity of horn 10 and, since horn 10 itself is symmetrical, only $TE_{1,0}$ mode energy which has a constant polarity across waveguide 13, is excited therein.

If there is angular error in only the vertical or H-plane between the axis of directivity of horn 10 and the transmitter, the phase front of the signal illuminating aperture 11 is symmetrical about the axis of directivity of horn 10 in the azimuth or E-plane but unsymmetrical thereabout in the H-plane and both $TE_{1,0}$ and $TE_{2,0}$ mode energy are excited in waveguide 13. The $TE_{1,0}$ mode energy exists in waveguide 13 with the same phase thereacross, but the $TE_{2,0}$ mode energy exists at the top of waveguide 13 with one phase and at the bottom thereof with exactly the opposite phase.

If there is angular error in only the E-plane between the axis of directivity of horn 10 and the transmitter, the phase front of the signal illuminating aperture 11 is symmetrical about the axis of directivity of horn 10 in the H-plane but unsymmetrical thereabout in the E-plane and $TE_{1,0}$, $TE_{1,1}$ and $TM_{1,1}$ modes are excited in waveguide 13. The $TE_{1,0}$ mode energy exists in waveguide 13 with the same phase thereacross but the $TE_{1,1}$ and $TM_{1,1}$ modes exist at one side of waveguide 13 with one phase and at the other side thereof with the opposite phase.

If there is angular error in both the E and H-planes between the axis of directivity of horn 10 and the transmitter, the phase front of the signal illuminating aperture 11 is unsymmetrical about the axis of directivity of horn 10 in both the E and H-planes and $TE_{1,0}$, $TE_{1,1}$, $TM_{1,1}$ and $TE_{2,0}$ modes are excited in waveguide 13. The $TE_{1,0}$ mode exists in waveguide 13 with the same phase thereacross, the $TE_{1,1}$ and $TM_{1,1}$ modes exist therein with opposite phases on opposite sides thereof, and the $TE_{2,0}$ mode exists therein with opposite phases at the top and bottom thereof.

Figure 2A:
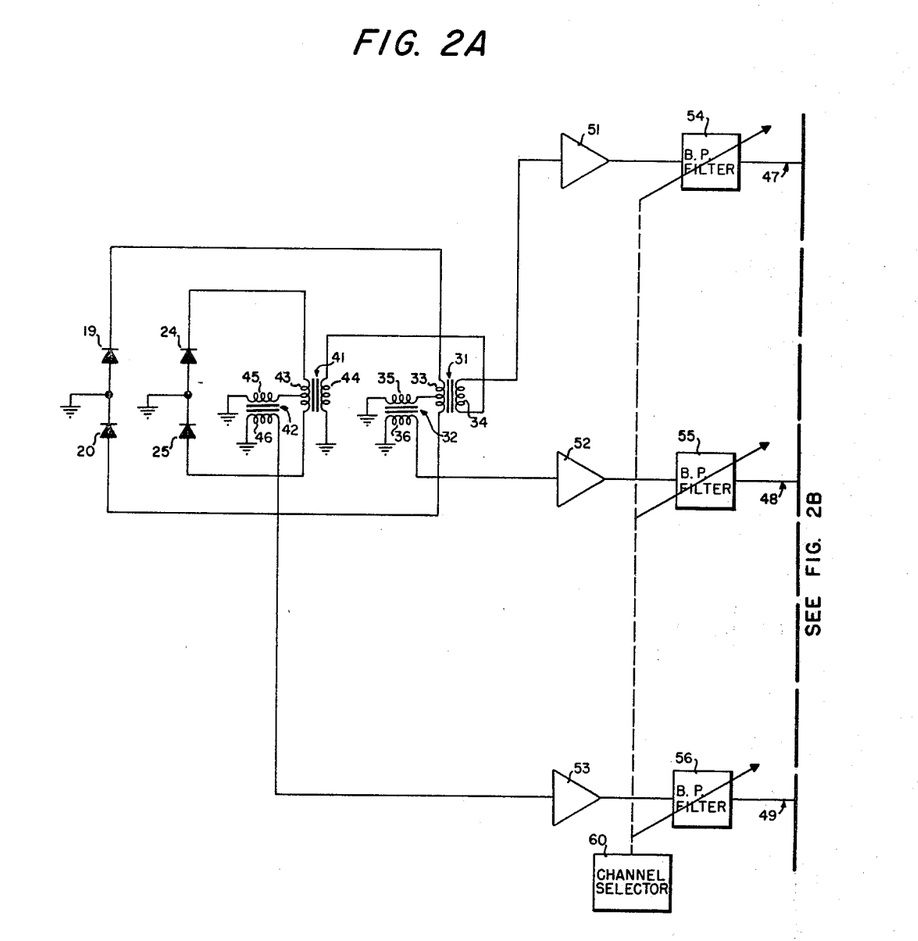
FIGS. 2A and 2B illustrate a circuit suitable for use with the horn of FIG. 1.
Figure 2B:
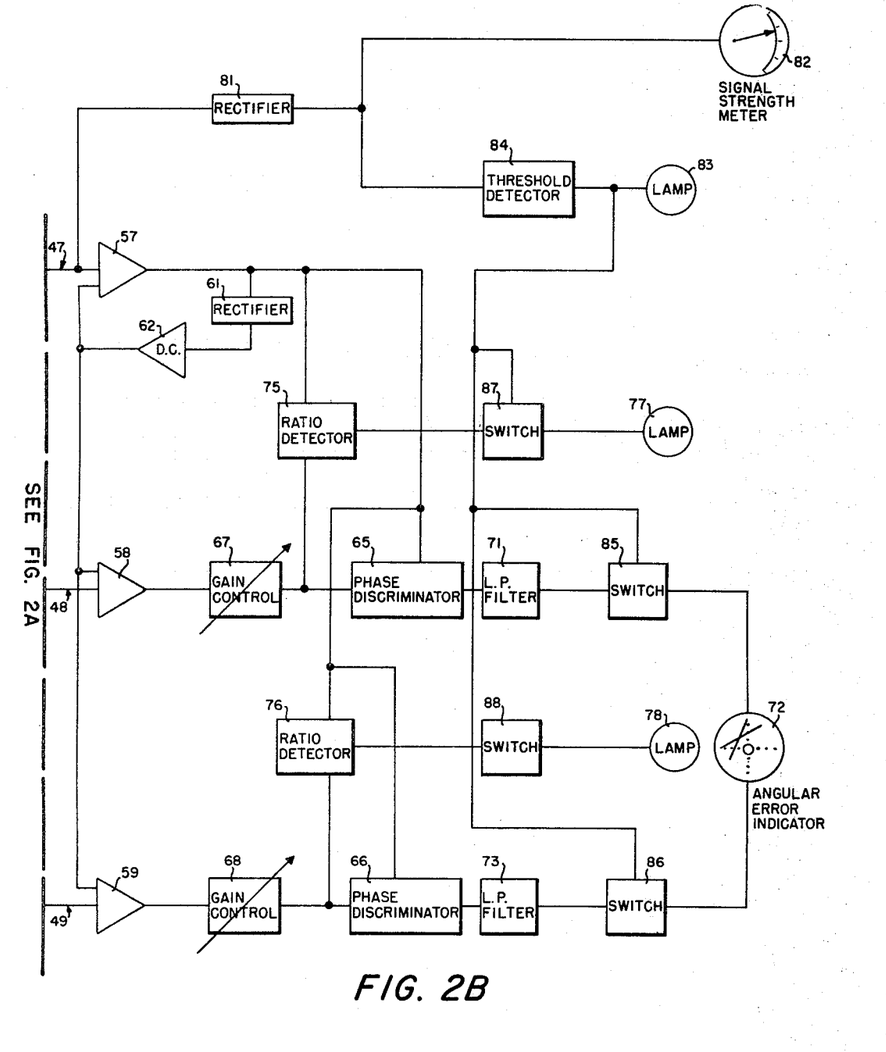

Turning now to FIGS. 2A and 2B, oppositely poled diodes 19 and 20 detect the modulation components of the $TE_{1,0}$, $TE_{1,1}$, and $TM_{1,1}$ modes coupled into waveguides 15 and 16 (FIG. 1) respectively. The modulation component of the $TE_{1,0}$ mode detected by detectors 19 and 20 is separated from the modulation components of the $TE_{1,1}$ and $TM_{1,1}$ modes detected in transformers 31 and 32 with the modulation component of the $TE_{1,0}$ mode being coupled from primary winding 33 to secondary winding 34 of transformer 31 and the modulation components of the $TE_{1,1}$ and $TM_{1,1}$ modes being coupled from the primary winding 35 to secondary winding 36 of transformer 32. Separation occurs because the $TE_{1,1}$ and $TM_{1,1}$ energy applied to primary winding 33 by detector 19 is in phase with and of equal amplitude to the $TE_{1,1}$ and $TM_{1,1}$ energy applied thereto by detector 20 and the $TE_{1,0}$ energy applied to primary winding 35 by detector 19 is equal in amplitude and opposite in phase to the $TE_{1,0}$ energy applied thereto by detector 20.

Oppositely poled diodes 24 and 25 respectively detect the amplitude modulation components of the $TE_{1,0}$ and $TE_{2,0}$ modes coupled into the upper and lower halves of waveguide 21 (FIG. 1). Transformers 41 and 42 separate the modulation component of the $TE_{1,0}$ mode from the modulation component of the $TE_{2,0}$ mode. The $TE_{1,0}$ energy detected by detectors 24 and 25 is coupled from primary winding 43 to secondary winding 44 of transformer 41 with the $TE_{2,0}$ energy detected by detectors 24 and 25 respectively bucking out across primary winding 43 since the $TE_{2,0}$ energy applied thereto by detector 24 is equal in amplitude and in phase with the $TE_{2,0}$ energy applied thereto by detector 25 and the $TE_{2,0}$ mode energy detected by detectors 24 and 25 is coupled from primary winding 45 to secondary winding 46 of transformer 42 with the $TE_{1,0}$ mode energy detected by detectors 24 and 25 bucking out across primary winding 45 since the $TE_{1,0}$ energy applied thereto by detector 24 is equal in amplitude and opposite in phase to the $TE_{1,0}$ energy applied thereto by detector 25.

The modulation component of the $TE_{1,0}$ mode energy appearing across secondary windings 34 and 44, which windings are connected in series, provides a reference signal which is applied to reference channel 47, the modulation components of the $TE_{1,1}$ and $TM_{1,1}$ modes appearing across secondary winding 36 provides an azimuth error signal which is applied to azimuth error channel 48, and the modulation component of the $TE_{2,0}$ mode energy appearing across winding 46 provides an elevation angle error signal which is applied to elevation angle error channel 49. Each of channels 47, 48, and 49 contains a series connected amplifier (51, 52 and 53 respectively), a bandpass filter (54, 55, and 56 respectively) and an automatic gain controlled amplifier (57, 58, and 59 respectively).

Amplifiers 51, 52, and 53 all have the same gain and this gain is selected to provide the desired system sensitivity.

Band-pass filters 54, 55, and 56, which are used when the present invention is used in a homing system having a number of transmitters each radiating on amplitude modulated signal having a unique frequency of modulation, are all ganged to channel selector 60. Channel selector 60 centers the band-pass each of filters 54, 55, and 56 about the modulation frequency of the transmitter upon which it is desired to home thereby insuring that the present invention will respond to only the desired transmitter. Of course, the modulation frequencies of any two transmitters within the range of the present invention must not be so close to one another that filters 54, 55, and 56 cannot discriminate therebetween. But, since the present invention contemplates the use of microwave transmitters, the same modulation frequency may be used for two or more transmitters provided that all transmitters with the same modulation frequency are spaced apart from one another a sufficient distance that the receiver of the present invention is within the range of only one of such transmitters at any one time.

Automatic gain controlled amplifiers 57, 58, and 59 are provided to maintain constant sensitivity in each of channels 47, 48, and 49 respectively. The automatic gain control signal is derived from the reference signal channel 47 and passed through a rectifier 61 and D.C. amplifier 62 before being coupled to amplifiers 57, 58, and 59.

The reference signal appearing at the output of amplifier 57 is coupled in parallel to respective inputs of phase discriminators 65 and 66. The other inputs of phase discriminators 65 and 66 are respectively coupled through respective gain control devices 67 and 68 to the azimuth angle error signal appearing at the output of amplifier 58 and to the elevation angle error signal appearing at the output of amplifier 59. Gain control devices 67 and 68, which, for example, may be variable attenuators, are provided to adjust the angle sensitivity.

The output of phase discriminator 65 is a low frequency voltage having a sign dependent on whether the azimuth angular error is to the right or left of the axis of directivity of horn 10 (FIG. 1) and a magnitude proportional to the magnitude of the azimuth angular error. This voltage is fed through a low pass filter 71, which filters out any high frequency noise, and then to the azimuth signal input of a conventional azimuth-elevation angle indicator 72. Likewise, the output of phase discriminator 66 is a low frequency voltage having a sign dependent on whether the elevation angular error is above or below the axis of directivity of horn 10 (FIG. 1) and a magnitude proportional to the magnitude of the elevation angular error. This voltage is also passed through a low pass filter 73 to eliminate any high frequency noise and then to the elevation angle input of indicator 72.

Figure 3A:
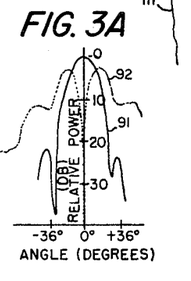
FIGS. 3A and 3B are graphs illustrating the limiting factors on the angular coverage of the horns of FIGS. 1, 4, and 5.
Figure 3B:
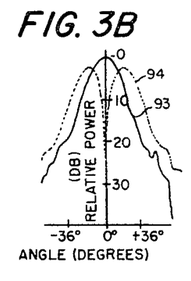

Turning for a moment to FIG. 3A, wherein curves 91 and 92 respectively represent the relative power in the signals appearing across secondary windings 34 and 36 (FIG. 2) plotted as a function of the azimuth angle between the axis of directivity of horn 10 (FIG. 1) and the transmitter upon which it is desired to home, and to FIG. 3B wherein curves 93 and 94 respectively represent the relative power in the signals appearing across secondary windings 44 and 46 (FIG. 2) plotted as a function of the elevation angle between the axis of directivity of horn 10 (FIG. 1) and the transmitter upon which it is desired to home, it can be seen that the useful angular coverage of the present invention is limited by the fact that side lobes appear in curves 91–94. Thus, in accordance with the teachings of this invention, it may be desirable to provide means in the receiver of FIGS. 2A and 2B to provide an indication of whether the receiver is or is not within its useful angular coverage.

Returning to FIGS. 2A and 2B, such an indication is provided by ratio detectors 75 and 76 and indicating means, such as lamps 77 and 78.

Ratio detector 75 has one input connected to reference channel 47 and another input connected to azimuth error channel 48 and the output of ratio detector 75 is coupled to lamp 77. By using curve 92 (FIG. 3A) and the sum of curves 91 and 93 (FIGS. 3A and 3B respectively), ratio detector 75 is selected to provide an output signal sufficient to light lamp 77 whenever the receiver of FIG. 2 is outside the useful azimuth coverage of horn 10 (FIG. 1).

Ratio detector 76 has one input connected to reference channel 47 and another input connected to elevation angle error channel 49 and the output of ratio detector 76 is coupled to lamp 78. By using the sum of curves 91 and 93 (FIGS. 3A and 3B respectively) and curve 94 (FIG. 3B), ratio detector 76 is selected to provide an output signal sufficient to light lamp 78 whenever the receiver of FIG. 2 is outside the useful elevation angular coverage of horn 10 (FIG. 1). Of course the desired indication of when the receiver is within or without the useful angular coverage of horn 10 (FIG. 1) is obtained if ratio detector 75 is selected to maintain lamp 77 lit only when the receiver is within the useful azimuth coverage and if ratio detector 76 is chosen to maintain lamp 78 lit only when the receiver is within the useful elevation angle coverage.

Approximate information as to the distance between the receiver of the present invention and the transmitter upon which it is desired to home may be obtained in two different ways. If maximum sensitivity is of primary concern, the information may be obtained as shown in FIGS. 2A and 2B by connecting rectifier 81 to reference signal channel 47 and signal strength meter 82 to rectifier 81. Alternatively, if maximum linearity is of primary concern, the information may be derived by feeding a portion of the output signal of rectifier 61 to signal strength meter 82. Signal strength meter 82 may be directly calibrated in terms of distance.

Also, lamp 83 may be provided to supply a visual indication of when the receiver of the present invention is within the useful range of the desired transmitter. This may be done by coupling a predetermined part of the distance information signal to the input of a threshold detector 84 having a threshold selected so that it produces an output signal only when the input signal thereto is of sufficient amplitude to indicate that the receiver of the present invention is within the useful range of the desired transmitter. Lamp 83 indicates the existence or nonexistence of an output signal from threshold detector 84.

Normally open switches 85 and 86 may be inserted between low pass filters 71 and 73 respectively and indicator 72 to maintain indicator 72 inoperative until the receiver of the present invention is within the useful range of the desired transmitter. Switches 85 and 86, which may be transistorized, relay operated or any other suitable type, close when the threshold of detector 84 is overcome. In a like manner, lamps 77 and 78 may be maintained inoperative when the receiver is beyond the useful range of the desired transmitter by inserting switches 87 and 88 between ratio detector 75 and lamp 77 and ratio detector 76 and lamp 78 respectively. Switches 87 and 88 close when a signal appears at the output of detector 84.

Figure 4:
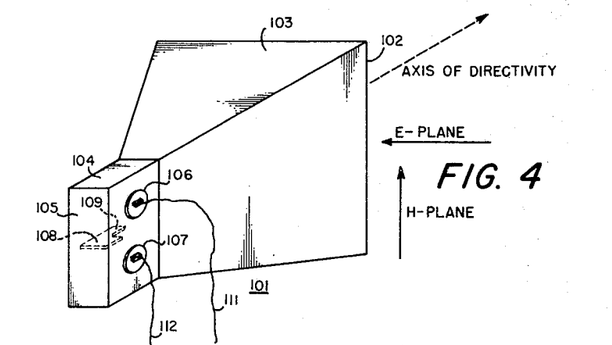
FIG. 4 is a perspective view of a horn suitable for use where the horn is illuminated by horizontally polarized or right or left circularly polarized energy and elevation angle error information is desired.

FIG. 4 illustrates a single-axis H-plane tracking horn 101 suitable for use with a transmitter radiating horizontally polarized or right or left circularly polarized energy to provide information as to the elevation angle between the axis of directivity of horn 101 and the transmitter. Horn 101 has a single aperture 102 and is symmetrical about its axis of directivity. The dimensions of aperture 102 and the flare rate thereto are selected according to well known principles to optimize beam width.

Flared portion 103 provides a transition between the required dimensions of aperture 102 and waveguide 104. Waveguide 104 has a height equal to the double dominant mode width so that the $TE_{1,0}$ and $TE_{2,0}$ mode energy excited in the H-plane in horn 101 propagate thereto. However, the width of waveguide 104 is so narrow that not even the cross-polarized $TE_{1,0}$ mode energy excited in horn 101 propagates into waveguide 104.

Waveguide 104 is terminated by a short circuiting plate 105 and has oppositely poled crystal detectors 106 and 107 and a metal septum 108 disposed therein.

Due to the symmetry of horn 101 and the definition of the mode, the $TE_{2,0}$ mode energy excited in the H-plane of horn 101 divides equally between and has opposite phases at detectors 106.

The length of waveguide 104, insertion depth of septum 108, and width of quarter wave step 109 on septum 108 are selected in accordance with principles well known in the art so that the energy in the $TE_{1,0}$ mode divides equally between and has the same phase at detectors 106 and 107 and so that the $TE_{1,0}$ mode energy is in phase with the $TE_{2,0}$ mode energy at one of detectors 106 and 107 of the opposite phase thereto at the other of detectors 106 and 107.

When aperture 102 is illuminated by an amplitude modulated, horizontally polarized or right or left circularly polarized signal having a phase front symmetrical in the H-plane about the axis of directivity of horn 101, only symmetrical mode energy (namely, the $TE_{1,0}$ mode) propagates into waveguide 104 and, thus, only the modulation component of the $TE_{1,0}$ mode energy appears on leads 111 and 112 which are respectively connected to detectors 106 and 107. However, when the signal illuminating aperture 102 has a phase front which is unsymmetrical in the H-plane about the axis of directivity of horn 101, unsymmetrical mode energy (namely, the $TE_{2,0}$ mode) also propagates into waveguide 104 and, hence the modulation components of both the $TE_{1,0}$ and $TE_{2,0}$ modes appear on leads 111 and 112.

Figure 5:
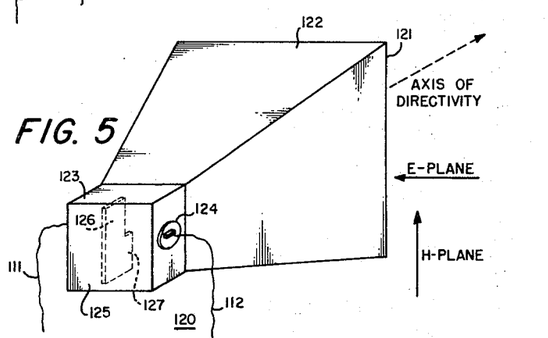
FIG. 5 is a perspective view of a horn suitable for use where the horn is illuminated by horizontally polarized or right or left circularly polarized energy and azimuth error information is desired.

FIG. 5 illustrates a single-axis E-plane tracking horn 120 which provides information as to the azimuth between the axis of directivity of horn 120 and a transmitter radiating a horizontally polarized or right or left circularly polarized signal. Horn 120 has a single aperture 121 and is symmetrical about its axis of directivity. The dimensions of aperture 121 and the flare rate thereto are selected according to known principles to optimize beam width.

Flared portion 122 provides a transition between the required dimensions of aperture 121 and waveguide 123. Waveguide 123 has a height and width capable of supporting the $TE_{1,1}$ and $TM_{1,1}$ modes excited in horn 120 when aperture 121 is unsymmetrically illuminated in the E-plane about its axis directivity.

Waveguide 123 has oppositely poled detectors disposed therein, only detector 124 being shown in FIG. 5, it being understood that a similar detector is located on the opposite side of waveguide 123 but hidden from view in the particular showing of horn 120 in FIG. 5. Waveguide 123 is terminated by a short circuiting plate 125 and is divided by a metal septum 126.

Due to the symmetry of horn 120 and the definition of the modes, the energy in the $TE_{1,1}$ and $TM_{1,1}$ modes excited in horn 120 divides equally between detector 124 and the detector hidden from view and has the same phase at both of the detectors.

The length of waveguide 123, the insertion depth of septum 126, and the width of quarter wave step 127 on septum 126 are selected through utilization of well known principles so that the energy in the $TE_{1,0}$ mode divides equally between and has opposite phases at the detectors and so that the $TE_{1,0}$ mode energy has the same phase as the $TE_{1,1}$ and $TM_{1,1}$ energy at one of the detectors and the opposite phase as that the $TE_{1,1}$ and $TM_{1,1}$ modes at the other of the detectors.

When aperture 121 is illuminated by an amplitude modulated signal having a phase front symmetrical in the E-plane about the axis of directivity of horn 120, only symmetrical mode energy (namely the $TE_{1,0}$ mode) propagates into waveguide 123 and, thus, only the modulation component of the $TE_{1,0}$ mode energy appears on leads 111 and 112 which are respectively connected to the hidden detector and to detector 124. However, when the signal illuminating aperture 121 has a phase front which is unsymmetrical in the E-plane about the axis of directivity of horn 120, unsymmetrical mode energy (namely, the $TE_{1,1}$ and $TM_{1,1}$ modes) propagates into waveguide 123 and, hence, modulation components of the $TE_{1,0}$, $TE_{1,1}$, and $TM_{1,1}$ modes appear on leads 111 and 112.

Figure 6:
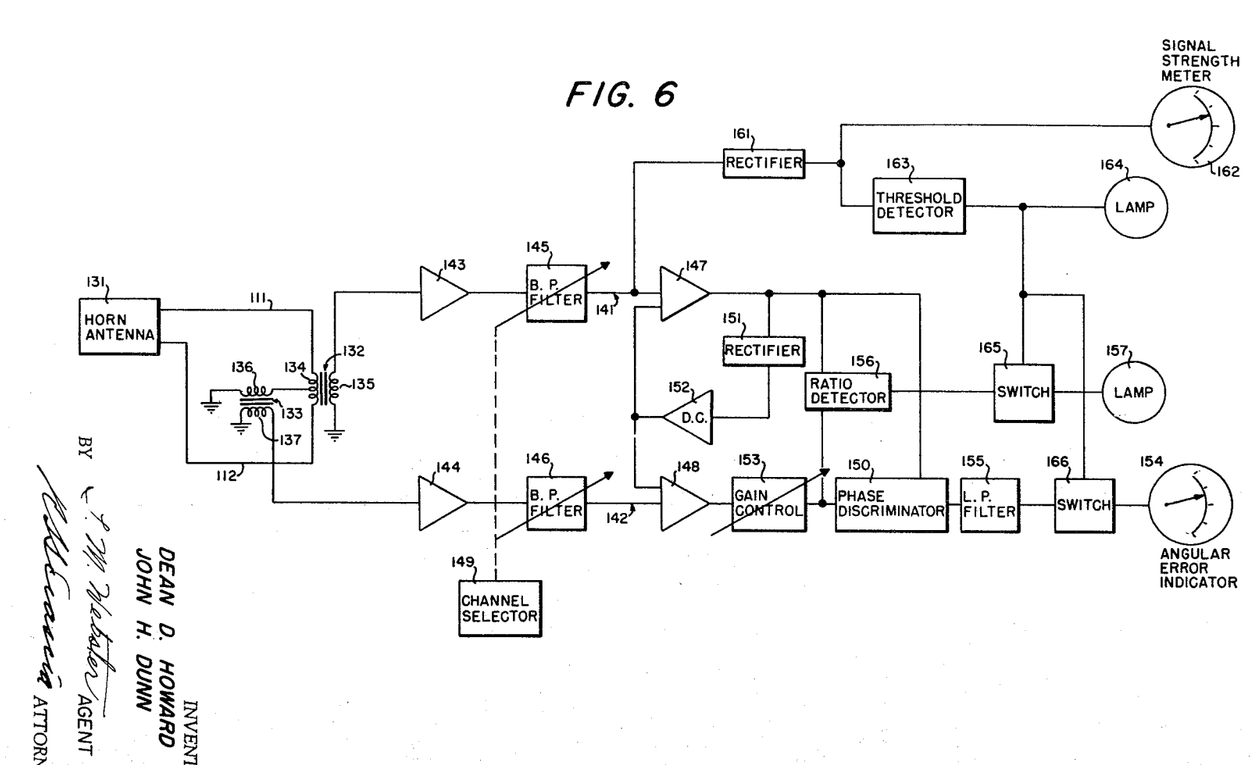
FIG. 6 illustrates a circuit suitable for use with the horns of either FIG. 4 or 5.

Turning now to FIG. 6 wherein a receiver suitable for use with a single-axis tracking horn is shown, antenna 131 may be either a horn such as that shown in FIG. 4 or a horn such as that shown in FIG. 5, it being understood that leads 111 and 112 of FIG. 6 correspond to similarly numbered leads in FIGS. 4 and 5.

Transformers 132 and 133 separate the modulation component of the symmetrical mode energy excited in antenna 131 (namely, the $TE_{1,0}$ mode whether the horn of FIGS. 4 or 5 is used as antenna 131) from the modulation component of the unsymmetrical mode energy excited therein (namely, the $TE_{2,0}$ mode if the horn of FIG. 4 is used as antenna 131 or the $TE_{1,1}$ and $TM_{1,1}$ modes if the horn of FIG. 5 is used as antenna 131). The modulation component of the symmetrical mode energy is coupled from primary winding 134 to secondary winding 135 with the modulation component of the unsymmetrical mode energy bucking out across primary winding 134 since the unsymmetrical mode energy appearing on lead 111 is equal in amplitude to and in phase with the unsymmetrical mode energy appearing on lead 112. The modulation component of the unsymmetrical mode energy is coupled from primary winding 136 to secondary winding 137 with the modulation component of the symmetrical mode energy bucking out across primary winding 136 since the symmetrical mode energy appearing on lead 111 is equal in amplitude and opposite in phase to the symmetrical mode energy appearing on lead 112. Secondary winding 135 constitutes the input to reference signal channel 141 and secondary winding 137 constitutes the input to angular error channel 142. Each of channels 141 and 142 contains an amplifier, 143 and 144 respectively; a band-pass filter, 145 and 146 respectively; and an automatic gain controlled amplifier, 147 and 148 respectively.

Amplifiers 143 and 144 each have the same gain and this gain is selected to provide the desired system sensitivity.

Band-pass filters 145 and 146, which are used when the receiver of FIG. 6 is used in a homing system having a number of transmitters each radiating a signal having a unique frequency of modulation, are both ganged to channel selector 149. Channel selector 149 centers the band-pass of both filters 145 and 146 about modulation frequency of the transmitter upon which it is desired to home thereby insuring that the receiver will respond to only the desired transmitter.

Automatic gain controlled amplifiers 147 and 148 are provided to maintain constant sensitivity in channels 141 and 142 respectively. The automatic gain control signal is derived from reference channel 141 by rectifier 151 and is then amplified in D.C. amplifier 152 before being applied to amplifiers 147 and 148.

Phase discriminator 150 has one input connected to the output of automatic gain controlled amplifier 147 and another input coupled to the output of automatic gain controlled amplifier 148. A gain control device 153, such as an attenuator, may be connected between amplifier 148 and phase discriminator 150 to adjust the angle sensitivity of angular error indicator 154.

The output of phase discriminator 150 is a low frequency voltage having a sign dependent on the direction of the angular error with respect to the axis of directivity of the antenna and a magnitude proportional to the magnitude of the angular error between the axis of directivity of antenna 131 and the desired transmitter. This voltage is fed through a low pass filter 155, to filter out any high frequency noise and then to angular error indicator 154.

Ratio detector 156 has one input connected to reference channel 141 and another input connected to angular error channel 142 and has its output coupled to lamp 157. If the horn of FIG. 4 is used as antenna 131, FIG. 3B is used to select ratio detector 156 so that it will provide a signal sufficient to light lamp 157 when the transmitter upon which it is desired to home is outside the useful elevation and a coverage of the horn of FIG. 4. Likewise, if the horn of FIG. 5 is used as antenna 131, FIG. 3A is used to select ratio detector 156 so that it will provide a signal sufficient to light lamp 157 when the transmitter upon which it is desired to home is beyond the useful azimuth coverage of the horn of FIG. 5. Approximate information as to the distance between the receiver of FIG. 6 and the transmitter upon which it is desired to home may be obtained either by connecting the input of rectifier 161 to channel 141 and the output of rectifier 161 to signal strength meter 162 as shown or by applying a predetermined portion of the output of rectifier 151 to signal strength meter 162.

A visual indication of when the receiver of FIG. 6 is within the useful range of the antenna upon which is desired to home may be obtained by coupling a portion of the rectified distance information signal to the input of a threshold detector 163 which has a threshold selected to provide an output signal only when the magnitude of the recified distance information signal indicates that the receiver is within the useful range of the transmitter. Lamp 164 provides a visual indication of the presence of an output from threshold detector 163.

Normally open switch 165 is connected between ratio detector 156 and lamp 157 and is closed by the appearance of an output voltage from threshold detector 163 thereby maintaining lamp 157 inoperative until the receiver of FIG. 6 is within the useful range of the transmitter upon which it is desired to home. Likewise, angular error indicator 154 is maintained inoperative until the receiver of FIG. 6 is within the useful range of the transmitter upon which it is desired to home by connecting normally open switch 166 between low pass filter 155 and indicator 154. Switch 166 closes when a signal appears at the output of threshold detector 163.

It should be understood that any one of the horns of FIGS. 1, 4 and 5 may be adapted for use where the radiated signal is vertically polarized. All that must be done to so adapt them, is to mechanically rotate them through 90°. When so oriented, any one of them is suitable for use to home on a transmitter radiating an amplitude modulated, vertically polarized or right or left circularly polarized signal. If the horn of FIG. 1 were rotated 90° and illuminated by a vertically polarized or right or left circularly polarized signals, channel 48 of FIGS. 2A and 2B would be the elevation angle error channel and channel 49 would be the azimuth angle error channel.

It should now be obvious that the present invention provides both a microwave homing system receiver capable of supplying accurate angular error information and approximate distance information.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A microwave receiver for homing on a given transmitter radiating an amplitude modulated, polarized signal, said receiver having an axis of directivity and providing information as to the angular error between said axis of directivity and said transmitter in the plane of at least one of the electric and magnetic field components of said signal, said receiver comprising:
    a single aperture microwave antenna of sufficient size to sustain higher order modes, said antenna being symmetrical about said axis of directivity whereby both symmetrical and unsymmetrical mode energy are excited therein upon illumination thereof by said signal when said plane of said component is unsymmetrical about said axis of directivity whereas only symmetrical mode energy is excited therein upon illumination thereof by said signal when said plane of said component is symmetrical about said axis of directivity;
    detector means coupled to said antenna for detecting the modulation components of said symmetrical and said unsymmetrical mode energy;
    separating means coupled to said detector means for separating the modulation component of said symmetrical mode energy from the modulation component of said unsymmetrical mode energy;
    phase discriminating means coupled to said separating means; and
    angular error indicating means coupled to said phase discriminating means to thereby provide an indication of said angular error in intelligible form.

2. The receiver of claim 1 wherein:
    said antenna is a single aperture horn;
    said symmetrical mode energy is the $TE_{1,0}$ mode; and
    said unsymmetrical mode energy is the $TE_{2,0}$ mode whereby said receiver provides an indication of the elevation angular error between said axis of directivity and said transmitter.

3. The receiver of claim 2 wherein:
    said detector means comprise first and second oppositely poled detectors;
    said $TE_{1,0}$ mode energy couples to said first and second detectors with equal amplitude and with the same phase; and
    said $TE_{2,0}$ mode energy couples to said first and second detectors with equal amplitude and with the same phase at said first detector as that with which the $TE_{1,0}$ mode energy couples thereto and with the opposite phase at said second detector from that with which the $TE_{1,0}$ mode energy couples thereto.

4. The receiver of claim 3 wherein:
    said separating means has a first output adapted to supply the modulation component of said $TE_{1,0}$ mode and a second output adapted to supply the modulation component of said $TE_{2,0}$ mode; and
    said phase discriminating means has first and second inputs and an output, with said output coupled to said angular error indicating means and adapted to provide a voltage proportional to said angular error and further including:
        a reference channel coupled between said first output and said first input; and
        an angular error channel coupled between said second output and said second input;
        each of said channels having in series connection:
            a band-pass filter centered at the frequency of the modulation component of said signal whereby said receiver homes exclusively on said transmitter; and
            an automatic gain controlled amplifier for maintaining constant sensitivity.

5. The receiver of claim 4 wherein:
    said filter and said amplifier in each of said channels are connected in the order named between said separating means and said phase discriminating means further including:
        a signal strength meter coupled to said reference channel, said meter being adapted to provide an approximate indication of the distance between said receiver and said transmitter;
        a threshold detector coupled to said reference channel, said threshold detector being adapted to be conductive only when said receiver is within the useful range of said transmitter;
        first indicating means coupled to said threshold detector to provide a visual indication of when said threshold detector is conductive;

a ratio detector having one input coupled to a point between said amplifier in said reference channel and said first input, another input coupled to a point between said amplifier in said angular error channel and said second input, and an output; and second indicating means coupled to said output of said ratio detector;

said ratio detector being adapted to cause a visual change in the indication provided by said second indicating means when said angular error is within the useful elevation angle coverage of said antenna from the indication provided thereby when said angle is without said useful elevation angle coverage.

6. The receiver of claim 1 wherein:

said antenna is a single aperture horn;

said symmetrical mode energy is the $TE_{1,0}$ mode; and said unsymmetrical mode energy is the $TE_{1,1}$ and $TM_{1,1}$ modes whereby said receiver provides an indication of the azimuth angular error between said axis of directivity and said transmitter.

7. The receiver of claim 6 wherein:

said detector means comprises first and second oppositely poled detectors;

the energy in said $TE_{1,1}$ and $TM_{1,1}$ modes couples to said first and second detectors with equal amplitude and with the same phase;

and the energy in said $TE_{1,0}$ mode divides equally between and has opposite phases at said detectors with the energy in the $TE_{1,0}$ mode at one of said detectors being in phase with the energy in the $TE_{1,1}$ and $TM_{1,1}$ modes thereat and with the energy in the $TE_{1,0}$ mode at the other of said detectors being of opposite phase to the energy in the $TE_{1,1}$ and $TM_{1,1}$ modes at said other detector.

8. The receiver of claim 7 wherein:

said separating means has a first output adapted to supply the modulation component of said $TE_{1,0}$ mode and a second output adapted to supply the modulation components of said $TE_{1,1}$ and $TM_{1,1}$ modes; and said phase discriminating means has first and second inputs and an output coupled to said angular error indicating means and adapted to provide a voltage proportional to said angular error; and further including:

a reference channel coupled between said first output and said first input; and an angular error channel coupled between said second output and said second input;

each of said channels having in series connection:

a band-pass filter centered at the frequency of the modulation component of said signal whereby said receiver homes exclusively on said transmitter; and an automatic gain controlled amplifier for maintaining constant sensitivity.

9. The receiver of claim 8 wherein:

said filter and said amplifier in each of said channels are connected in the order named between said separating means and said phase discriminating means and further including:

a signal strength meter coupled to said reference channel, said meter having adapted to provide an approximate indication of the distance between said receiver and said transmitter;

a threshold detector coupled to said reference channel, said threshold being selected so that said threshold detector is conductive only when said receiver is within the useful range of said transmitter;

first indicating means coupled to said threshold detector to provide a visual indication of when said threshold detector is conductive;

a ratio detector having one input coupled to a point between said amplifier in said reference channel and said first input, another input coupled to a point between said amplifier in said angular error channel and said second input, and an output; and second indicating means coupled to said output of said ratio detector;

said ratio detector being adapted to cause a visual change in the indication provided by said second indicating means when said angular error is within the useful azimuth coverage of said antenna from the indication provided thereby when said angular error is without said useful azimuth coverage.

10. The receiver of claim 1 wherein:

said antenna is a single aperture horn;

said symmetrical mode energy is the $TE_{1,0}$ mode; and said unsymmetrical mode energy is the $TE_{1,1}$, $TM_{1,1}$, and $TE_{2,0}$ modes; and wherein said separating means further includes means for separating the modulation components of the $TE_{1,1}$ and $TM_{1,1}$ modes from the modulation component of the $TE_{2,0}$ mode whereby said receiver provides an indication of both the azimuth and elevation angular error between said axis of directivity and said transmitter.

11. The receiver of claim 10 wherein:

said detector means comprise first and second oppositely poled diodes and third and fourth oppositely poled diodes;

the energy in said $TE_{1,1}$ and $TM_{1,1}$ modes couples to said first and second detectors with equal amplitude and with the same phase;

the energy in said $TE_{2,0}$ mode couples to said third and fourth detectors with equal amplitude and opposite phases, and wherein;

the energy in said $TE_{1,0}$ mode couples to all of said detectors with the same amplitude and to one of said first and second detectors with the same phase as the energy in the $TE_{1,1}$ and $TM_{1,1}$ modes at said one of said first and second detectors, to the other of said first and second detectors with the opposite phase to that of the energy in the $TE_{1,1}$ and $TM_{1,1}$ modes at said other of said first and second detectors, and to said third and fourth detectors with the same phase as the energy in the $TE_{2,0}$ mode at one of said third and fourth detectors.

12. The receiver of claim 11 wherein:

said separating means has a first output adapted to supply the modulation component of said $TE_{1,0}$ mode, a second output adapted to supply the modulation components of said $TE_{1,1}$ and $TM_{1,1}$ modes, and a third output adapted to supply the modulation component of said $TE_{2,0}$ mode; and said phase discriminating means has first, second, third, and fourth inputs, one output coupled to said angular error indicating means and adapted to provide a voltage proportional to the azimuth angular error between said axis of directivity and said transmitter and another output coupled to said angular error indicating means and adapted to provide a voltage proportional to the elevation angle between said axis of directivity and said transmitter; and further including:

a reference channel coupled between said first output and said first and third inputs;

an azimuth angular error channel connected between said second output and said second input; and an elevation angular error channel connected between said third output and said fourth input;

each of said channels having in series connection:

a band-pass filter centered at the frequency of the modulation component of said signal whereby said receiver homes exclusively on said transmitter; and an automatic gain controlled amplifier for maintaining constant sensitivity.

13. The receiver of claim 12 wherein:

said filter and said amplifier in each of said channels are connected in the order named between said separating means and said phase discriminating means and further including:

a signal strength meter coupled to said reference channel, said meter being adapted to provide an approximate indication of the distance between said receiver and said transmitter;

a threshold detector coupled to said reference channel, said threshold being selected so that said threshold detector is conductive only when said receiver is within the useful range of said transmitter;

first indicating means coupled to said threshold detector to provide a visual indication of when said threshold detector is conductive;

a first ratio detector having one input coupled to a point intermediate said amplifier in said reference channel and said first input, another input coupled to a point between said amplifier in said azimuth angular error channel and said second input, and an output;

second indicating means coupled to said output of said first ratio detector, said first ratio detector being adapted to cause a visual change in the indication provided by said second indicating means when said azimuth angular error is within the useful azimuth coverage of said antenna from the indication provided thereby when said azimuth angular error is without said useful azimuth coverage;

a second ratio detector having one input coupled to said point intermediate said amplifier in said reference channel and said first input, another input coupled to a point between said amplifier in said elevation angle error channel and said fourth input, and an output; and third indicating means coupled to said output of said second ratio detector, said second ratio detector being adapted to cause a visual change in indication provided by said third indicating means when said elevation angular error is within the useful elevation angle coverage of said antenna from the indication provided thereby when said elevation angular error is without said useful elevation angle coverage.

References Cited

UNITED STATES PATENTS

| 2,931,033 | 3/1960 | Miller | 343—16 |
| 3,274,604 | 9/1966 | Lewis | 343—786 |

RODNEY D. BENNETT, *Primary Examiner.*

R. E. BERGER, *Assistant Examiner.*